April 11, 1972 — R. J. DEISENROTH — 3,655,854
METHOD FOR BEDDING PANELS INTO FRAMES
Filed Sept. 8, 1970 — 2 Sheets-Sheet 1
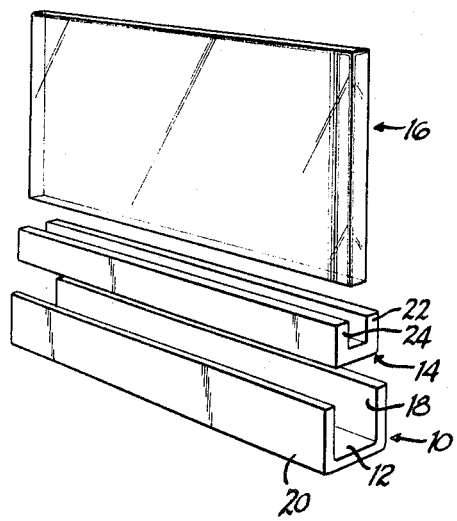
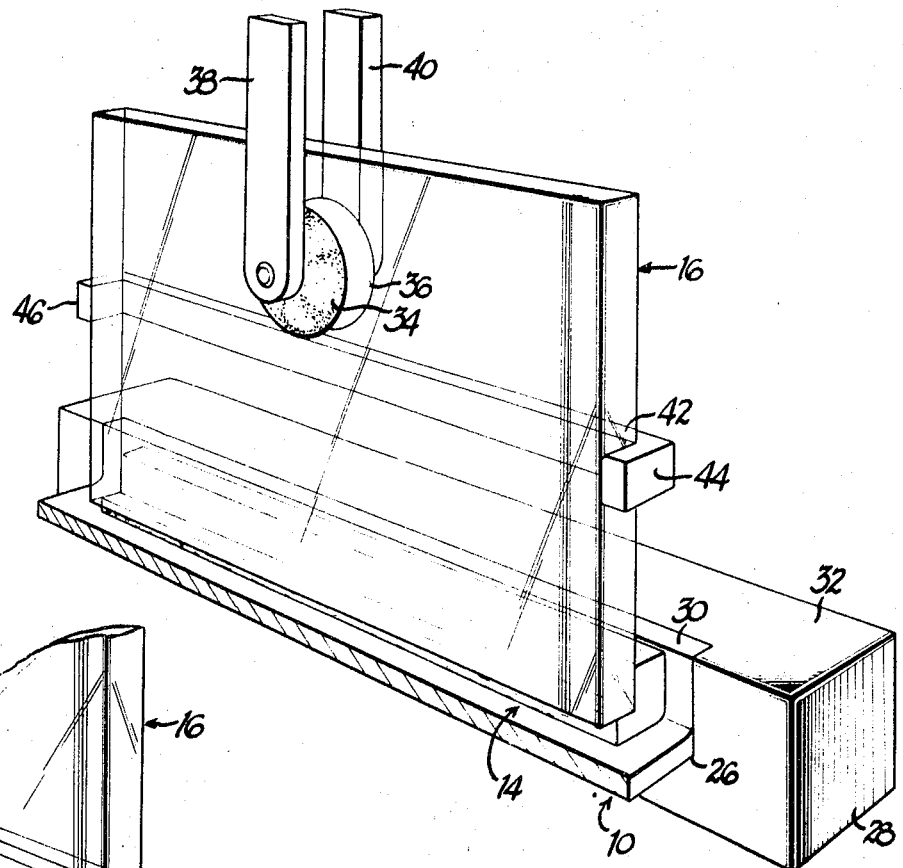
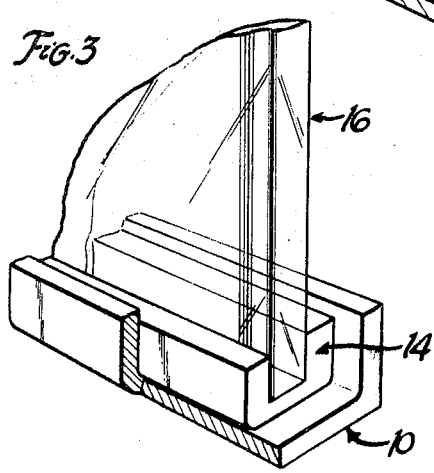
Inventor:
ROBERT J. DEISENROTH
By Wilson, Settle, Batchelder & Craig
ATT'YS.

April 11, 1972  R. J. DEISENROTH  3,655,854
METHOD FOR BEDDING PANELS INTO FRAMES
Filed Sept. 8 1970  2 Sheets-Sheet 2

Inventor:
ROBERT J. DEISENROTH
By
Wilson, Settle, Batchelder
Attys.  & Craig

United States Patent Office 3,655,854
Patented Apr. 11, 1972

3,655,854
METHOD FOR BEDDING PANELS INTO FRAMES
Robert J. Deisenroth, Elkhart, Ind., assignor to
Excel Corporation, Elkhart, Ind.
Continuation-in-part of application Ser. No. 789,714, Jan. 8, 1969, which is a continuation-in-part of application Ser. No. 531,242, Mar. 2, 1966. This application Sept. 8, 1970, Ser. No. 70,570
Int. Cl. B32b *31/12, 31/26*
U.S. Cl. 264—134                1 Claim

ABSTRACT OF THE DISCLOSURE

The invention provides a method for bedding a panel into a frame member having an interior surface forming a recess to receive a marginal edge of the panel. In accordance with the invention, the panel may be a glass member and the frame a metal channel, the two elements forming the window sash for an automobile. The method includes the step of forming a solid, rigid body of thermoplastic resinous bedding material having an interior surface forming a recess. The body is dimensioned to fit into the frame member and to receive the marginal edge of the panel in the recess of the body. A heat curable thermosetting resinous material is coated over the entire surface of the solid body and the thus coated body is placed in the recess of the frame member. A marginal edge of the panel is then placed within the recess of the solid body and in contact with the curable resinous material. The solid body is then heated to cure the uncured resinous thermosetting material and make plastic the solid body to wet the members and provide good adherence of the solid body to both the panel and the frame member. The assembly is then cooled to a solid condition.

CROSS-REFERENCE TO RELATED APPLICATIONS

This application is a continuation-in-part of my application Ser. No. 789,714, filed Jan. 8, 1969, now abandoned, which was in turn a continuation-in-part of my application Ser. No. 531,242, filed Mar. 2, 1966, now abandoned.

The present application is related to my U.S. Letters Pat. No. 3,263,014, issued July 26, 1966 and filed on Sept. 10, 1962.

BACKGROUND OF THE INVENTION

Although the utility of the present invention is not restricted to a specific application, the invention is particularly useful in bedding the glass of automobile windows into frames. As is well known, the glass of an automobile window frequently has a frame member extending along at least one edge of the glass and in some cases more than one edge is framed. One of the known and rather commonly used methods of bedding glass panels into frames involves the use of strips of uncured rubber material. The worker folds a rubber strip over the edge of the window and then inserts the edge with the folded-over rubber into a channel-shaped frame. Any excess rubber material is trimmed off with a hot knife, and the window is ordinarily cleaned before the bedding process is completed. Any variations in glass thickness may be compensated for by using different thicknesses of rubber. The entire operation is carried out by hand, and it is evident that this manual method has relatively high labor cost. It has other disadvantages also, for example, the rubber strips do not hold up well with weathering, the process is relatively heavy, and tapes of different thicknesses must be used to compensate for variations of glass thickness.

A bedding method has been proposed wherein the bedding material is initially injected between the frame and the panel as a liquid and is subsequently cured to a solid state to form a permanent bedding for the panel. This method automatically compensates for variation in glass thickness, does not require trimming and is a clean procedure and does not require washing or other cleaning of the glass and frame assembly. A method of this type is described in my aforementioned U.S. Letters Patent.

In spite of the many advantages of this method over the method of using rubber strips, the former method does have drawbacks. All of the edges of the frame member must be pressure sealed before the liquid material is injected into the space within the frame member. The material is injected in liquid condition, and care must be exercised to keep the liquid from spilling or running over onto the apparatus involved in the operation.

The method of the present invention now proposes to provide a solid body of bedding material which can be handled in a solid form throughout the bedding operation. This eliminates the handling of liquids in the process and also obviates any need for sealing the edges of the frame to prevent escape of liquid from the frame. Briefly, the method of the present invention comprises the following steps:

(a) Forming a solid rigid body of thermoplastic resinous bedding material having the same configuration as the frame in which the body is to be inserted;

(b) Coating over the entire surface of said body with uncured liquid thermosetting resinous material;

(c) Placing the solid resinous body in a recess of the frame member with the curable resinous material at the exterior surface of the body in contact with the recessed surface of the frame member;

(d) Placing a marginal edge of the panel within the recess of the solid body and in contact with curable resinous material at the interior surface of the body, and (e) Heating the solid body sufficiently to cure the uncured resinous bedding material and make plastic the material of the thermoplastic body to wet the members and provide good adherence of the resinous body to both the panel and the frame member.

Accordingly, it is an object of the present invention to provide a bedding method wherein the bedding material is initially formed into a solid body such that the bedding material may be handled in solid form throughout the remainder of the bedding method.

Another object of the invention is to provide bedding material between a frame and an edge of a panel therein in the form of a solid body which is assembled along with the frame and the panel.

Other objects of this invention will appear in the following description and appended claims, reference being had to the accompanying drawings forming a part of this specification wherein like reference characters designate the corresponding parts in the several views.

In the drawings:

FIG. 1 is an exploded perspective view showing a frame, a channel-shaped body of resinous material and a panel as they might be positioned before assembling the resinous body and the panel into the frame;

FIG. 2 is a perspective view partly in section showing the frame, the solid body and the panel in their assembled positions and held together by suitable fixtures;

FIG. 3 is a fragmentary perspective view of the completed glass and frame assembly;

Figure 4:
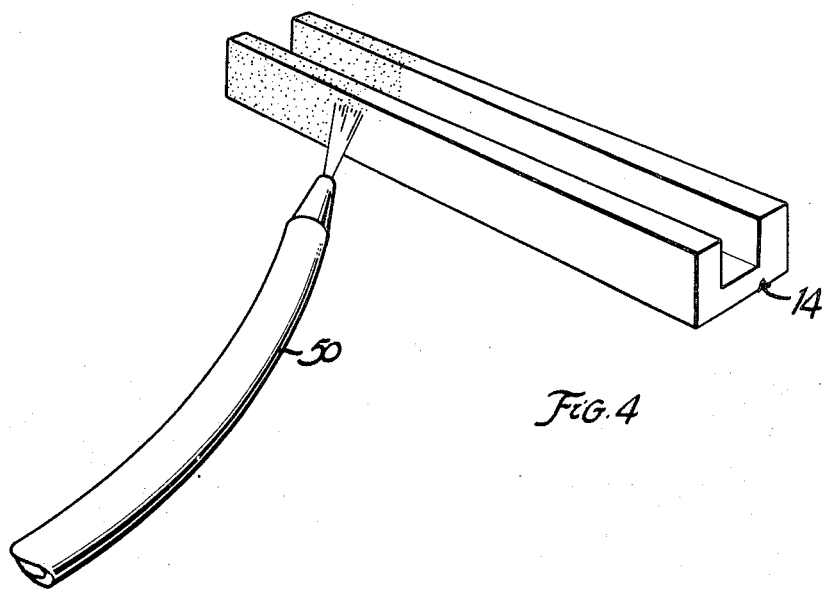
FIG. 4 is a perspective view showing the solid resinous body being coated with uncured resinous bedding material before it is assembled with a frame and panel.

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation.

DETAILED DESCRIPTION OF A PREFERRED EMBODIMENT

Referring to FIG. 1, the three elements which are assembled together to make a panel and frame assembly are shown. The frame 10 has a channel configuration with an interior channel surface 12 so dimensioned as to receive both the solid body 14 of resinous material and an edge of the glass panel 16. Flanges 18 and 20 of the frame member have a slightly greater height than the side flanges 22 and 24 of resinous body 14 so that flanges 22 and 24 do not project above the top surface of flanges 18 and 20. There is just enough space between side flanges 18 and 20 to receive the solid resinous body 14 with a tight fit. Likewise, the space between flanges 22 and 24 of body 14 is only slightly greater than the thickness of the panel 16 so that the lower edge of the panel is received tightly within the recess extending down the middle of channel-shaped body 14.

The first step of the method is to form the solid body 14 to the same channel-shaped configuration as the frame 10 as shown in FIG. 1. This may be done by a moulding step, either casting or extrusion as desired. A thermoplastic resin is used for the solid body. The body 14 may be handled as a solid throughout the remainder of the processing.

After the solid body 14 is formed, it is, as shown in FIG. 4, coated entirely over the surface thereof with an uncured thermosetting liquid resinous material which can be cured to a solid condition in the final step of the process. The solid body 14 is illustrated as being coated by a spray issuing from a spray nozzle 50. The spray is the thermosetting liquid bedding material, and it deposits on the solid body 14 to form a coating of uncured material on the entire surface of the solid body 14. This coated body 14 may then be placed in the frame 10 and the lower edge of the panel 16 may be inserted within the central recess in solid body 14 to complete the assembly steps.

Figure 5:
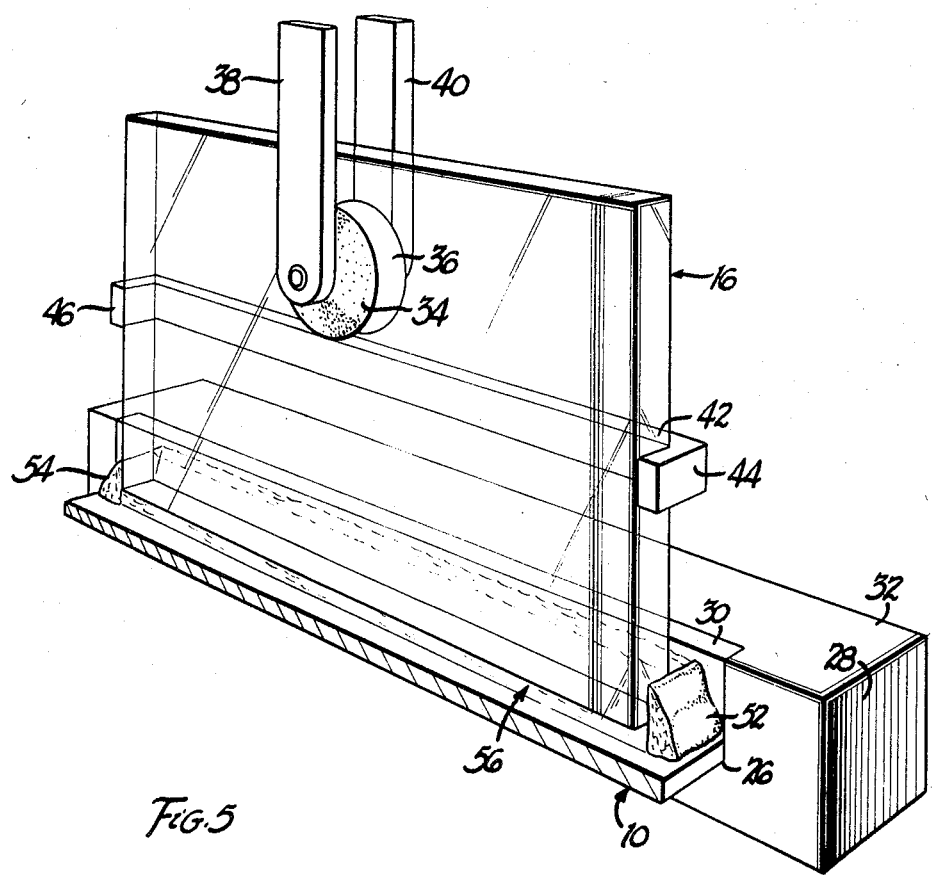
FIG. 5 is a perspective view partly in section showing the condition of the thermoplastic resinous body when it is heated at a final stage of the method.

Then the assembly is heated as shown in FIG. 5. Provision is made to keep plastic or liquid resinous material from running out of frame 12. As illustrated, dams 52 and 54 extend transversely across the frame member 12 and block the material 56 so that it cannot flow out of the ends of the frame. The thermoplastic material may either become liquid or plastic during this heating step, (the term "plastic" being used in the sense of being soft and pliable and capable of flowing as a viscous material does). This depends somewhat on the temperatures and specific type of thermoplastic material used. During the course of the heating the body 14 conforms to the exact shape of the frame channel 10 and panel 16 to improve the bonding characteristics by placing the resinous material in direct contact with the channel and panel.

When the thermoplastic material is subjected to a temperature sufficient to plasticize or melt a portion thereof, the outer surface of the solid resinous body wets the frame member. This in itself provides some adhesion. However, the normal adhesion of the thermoplastic body is enhanced and improved by use of the curable thermosetting coating thereon. The curable coating provides improved adhesion with the frame member and with the panel.

During the assembly and heating operation, as will be noted in FIGS. 2 and 5, the frame is supported on a recessed shelf provided in the fixture block 28 and the top surface 30 of the frame is flush with the top surface 32 of block 28. The panel 16 is held in place by suction cups 34 and 36 in contact with opposite sides of the panel and retained on supporting arms 38 and 40. The panel 16 is braced and held against horizontal movement by a frame 42 which has arms 44 and 46 embracing the panel and abutting against it.

This assembly is placed in an oven for heating purposes. The oven temperature may be 250° F. for example, and the assembly may remain in the oven for 45 seconds. There are other methods of heating the resinous material, for example, cartridge heaters may be imbedded in the fixture block 28 in positions where the heat from the cartridges will heat up the metal frame 12 and transfer heat to the resinous body 14 by conduction so as to cure the body to a fully cured condition. Alternatively, current may be passed directly through the frame 12 so as to heat up the frame and consequently heat the solid body 14. High frequency induction heating might be employed if desired.

When the heating step is completed, the sash assembly consisting of the panel 16, the bed 14 and the frame 10 may be removed from the fixtures. The bed 14 of fully cured, solid resinous material adheres both to the panel and to the frame and provides a solid resilient bed for the panel in the frame.

As previously mentioned, the resinous material which is employed for the solid body is a thermoplastic material. The material should have the following properties:

(1) Resiliency—to provide a suitable bedding for the glass;

(2) Adherence—to provide a bond between the glass and the metal frame;

(3) Curability—the thermosetting material should be curable to a solid state in a relatively short time by the application of heat, for example, within about 45 seconds at about 250° F.

(4) Resistance to weathering (sunlight, temperature changes and moisture absorption);

(5) Mechanical properties—such as tensile strength, compressive strength, impact resistance and toughness sufficient to withstand the stresses normally encountered in use of the final assembly.

One resin suitable as the thermoplastic bedding material is polyvinylidene chloride. Such a material is marketed by the Excel Corporation of Elkhart, Ind., under the trademark "XL8." Other polyvinyl thermoplastic resinous materials may also be used.

The thermosetting liquid resinous material may be, for example, an epoxy resinous adhesive sold commonly on the market by many companies, for example, Armstrong Products Co., Inc., of Warsaw, Ind., The Marblette Corp., Long Island City, N.Y., under the trademark "Maraset," and by the Shell Chemical Co. under the trademark "Epon," of New York, N.Y.

Thus, the invention provides a method wherein once the resinous material is formed into a solid body at the beginning of the method, it is handled in solid form throughout the rest of the method. If the process is practised manually, the solid form of the resinous body can be handled quite easily and more quickly than rubber tapes, for example, and the problems of handling liquid material are obviated. The steps of the assembly method are straightforward and can be easily carried out by using high production techniques.

What I claim as my invention is:

1. A method of bedding a panel into a frame member having an interior surface forming a recess to receive a marginal edge of said panel, said method comprising the steps of forming a solid, rigid body of a thermoplastic bedding material having an interior surface forming a recess, said body being dimensioned to fit in said frame member and to receive said marginal edge of said panel in said recess of said body, coating over the entire surface of said body with uncured thermosetting resinous bedding material, placing said solid resinous body in said recess of said frame member with resinous material at the exterior surface of said body in contact with said interior surface of said frame member, placing the marginal edge of said panel within the recess of said solid body and in contact with resinous bedding material at the interior surface thereof, and heating said solid body sufficiently to cure said uncured thermosetting resinous bedding material and render the thermoplastic body at least plastic to wet the members and provide good adherence of the resinous body to both the panel and to the frame member, and then cooling said material to a solid condition.

References Cited

UNITED STATES PATENTS

| | | | |
|---|---|---|---|
| 2,385,941 | 10/1945 | Reynolds | 264—261 |
| 2,679,913 | 6/1954 | Scott | 264—249 |
| 3,122,274 | 2/1964 | Quinche | 264—249 |
| 3,340,224 | 9/1967 | Sherman et al. | 156—293 |

ROBERT F. WHITE, Primary Examiner

J. H. SILBAUGH, Assistant Examiner

U.S. Cl. X.R.

156—293, 306, 313; 264—248